(12) United States Patent
Clark, Jr.

(10) Patent No.: US 7,698,767 B2
(45) Date of Patent: Apr. 20, 2010

(54) COMBINATION BAR TOOL

(76) Inventor: Christopher Bayne Clark, Jr., 997 Fow Winds Rd., N. Ferrisburgh, VT (US) 05473

( * ) Notice: Subject to any disclaimer, the term of this patent is extended or adjusted under 35 U.S.C. 154(b) by 0 days.

(21) Appl. No.: 12/157,786

(22) Filed: Jun. 14, 2008

(65) Prior Publication Data

US 2009/0007342 A1    Jan. 8, 2009

Related U.S. Application Data

(60) Provisional application No. 60/934,562, filed on Jun. 14, 2007.

(51) Int. Cl.
*B67B 7/44* (2006.01)
(52) U.S. Cl. ............................. 7/155; 81/3.09
(58) Field of Classification Search ............... 7/155; 81/3.09
See application file for complete search history.

(56) References Cited

U.S. PATENT DOCUMENTS

| 350,499 | A | * | 10/1886 | Noe | 81/3.09 |
|---|---|---|---|---|---|
| 880,505 | A | * | 3/1908 | Bryers | 7/155 |
| 1,443,861 | A | * | 1/1923 | Barr | 215/390 |
| 1,695,098 | A | * | 12/1928 | Hiering | 81/3.35 |
| 2,781,069 | A | * | 2/1957 | Byrd | 99/508 |
| 2,886,994 | A | * | 5/1959 | Hanson | 81/3.35 |
| 4,531,381 | A | * | 7/1985 | Toro et al. | 62/372 |
| 4,580,303 | A | * | 4/1986 | Henshaw | 7/155 |
| D301,113 | S | * | 5/1989 | Lapsker | D8/42 |
| D301,532 | S | * | 6/1989 | Holterscheidt | D7/624.1 |
| D301,539 | S | * | 6/1989 | Cheung | D8/41 |
| 4,870,754 | A | * | 10/1989 | Chiou | 30/123 |
| D455,059 | S | * | 4/2002 | Stirling | D8/40 |
| 6,519,799 | B1 | * | 2/2003 | Bartholomew | 7/155 |
| 6,957,599 | B2 | * | 10/2005 | Corredor et al. | 81/3.09 |
| 7,510,092 | B2 | * | 3/2009 | Sholem | 211/70.6 |
| 2005/0138736 | A1 | * | 6/2005 | Tarlow | 7/110 |
| 2006/0109886 | A1 | * | 5/2006 | Harris | 374/121 |
| 2007/0131118 | A1 | * | 6/2007 | Bruce | 99/276 |

FOREIGN PATENT DOCUMENTS

WO    WO 8803512 A1 * 5/1988

* cited by examiner

*Primary Examiner*—David B Thomas
(74) *Attorney, Agent, or Firm*—James Marc Lea

(57) ABSTRACT

One embodiment of the present patent application is a device, comprising a first piece and a second piece. The first piece includes a stirring spoon, a bottle opener, and a corkscrew. The corkscrew has a corkscrew base. The second piece includes a removable cover that attaches to the corkscrew base to cover the corkscrew.

28 Claims, 9 Drawing Sheets

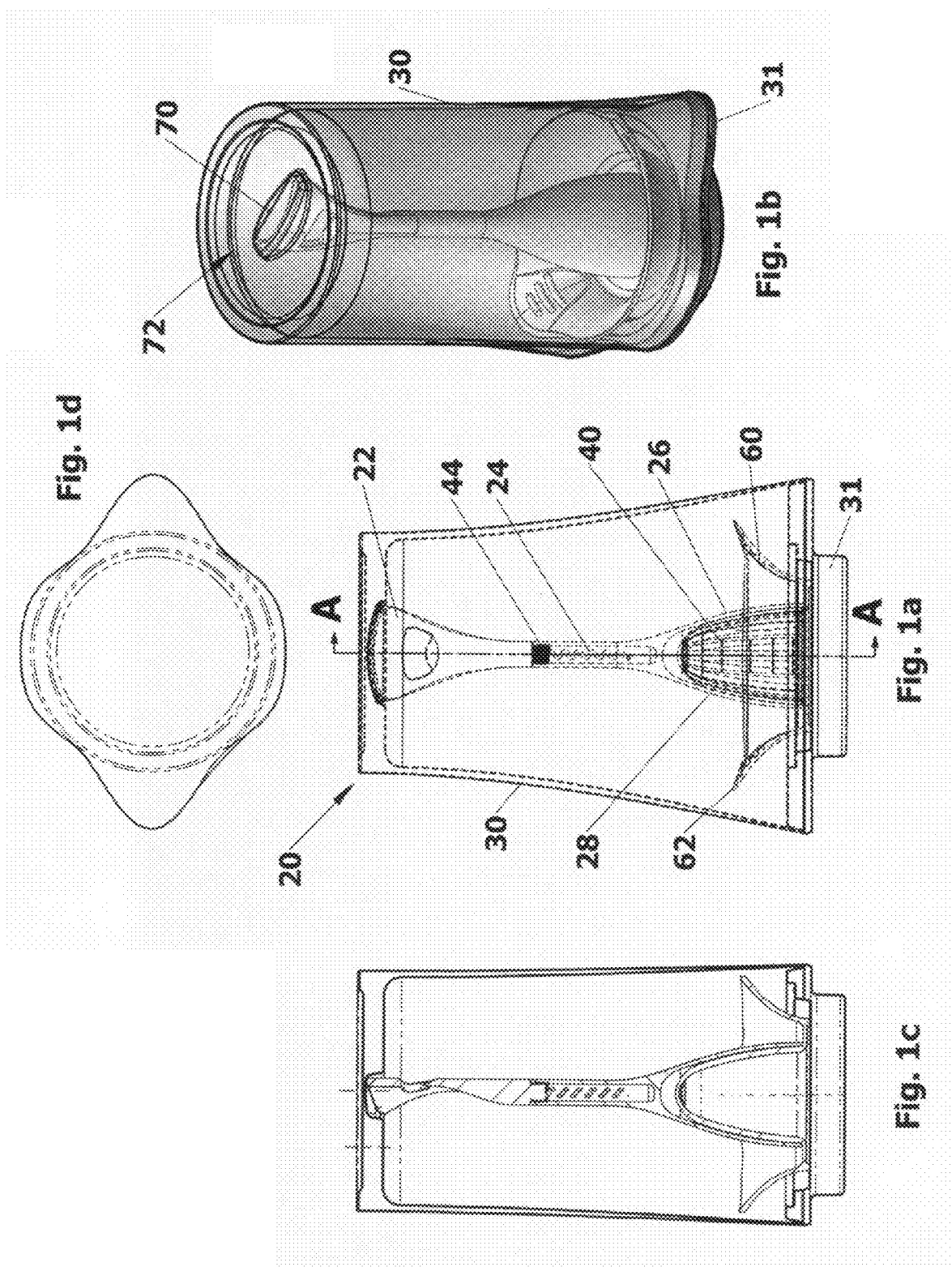

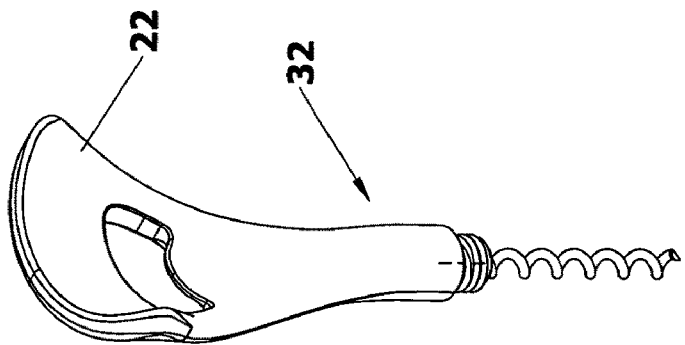
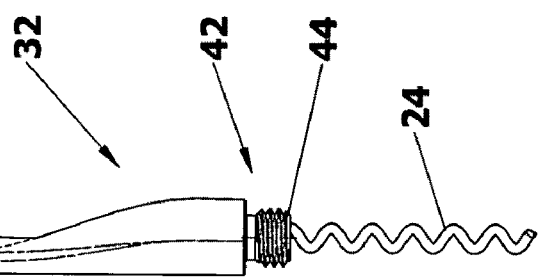
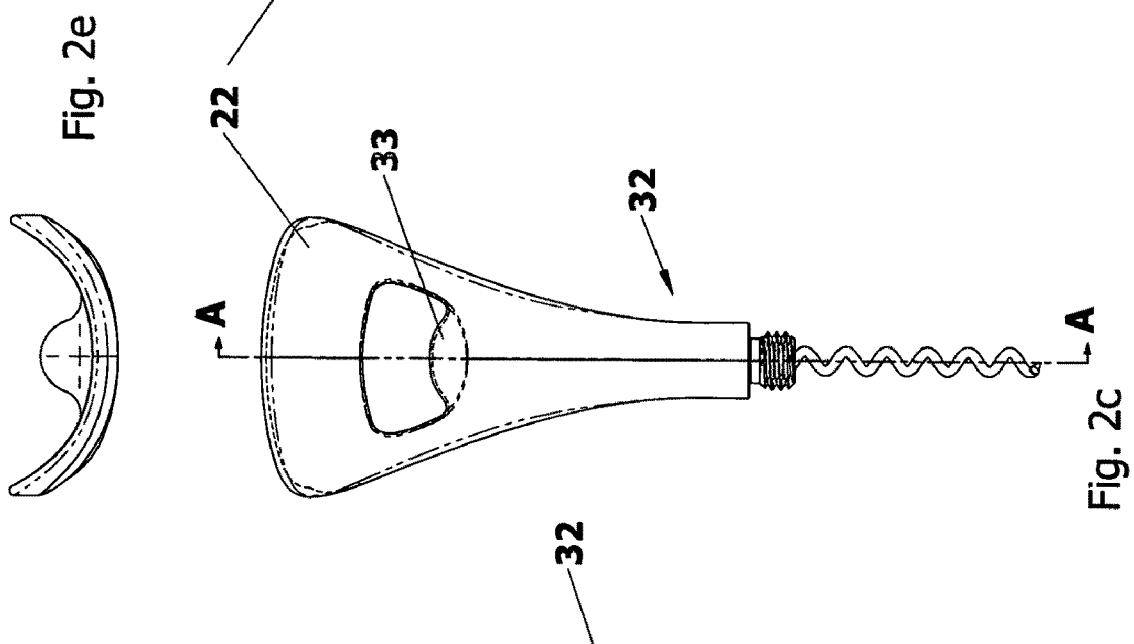
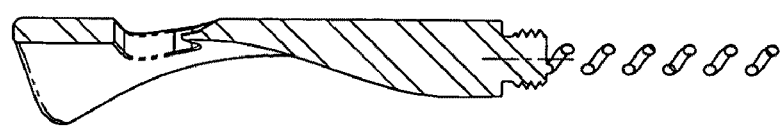

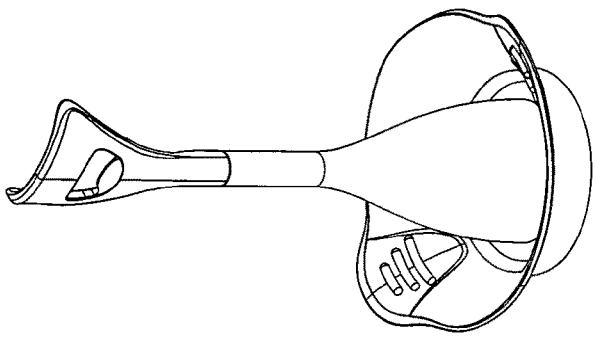
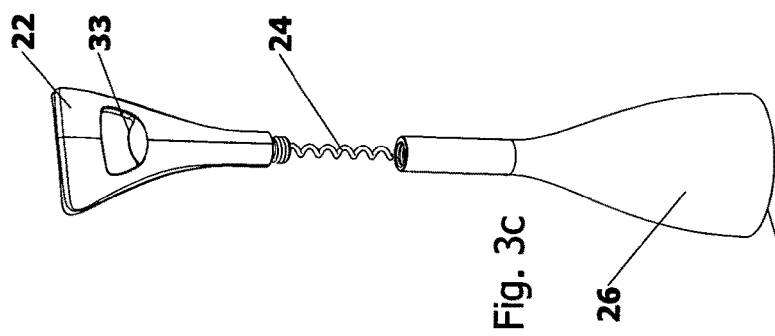
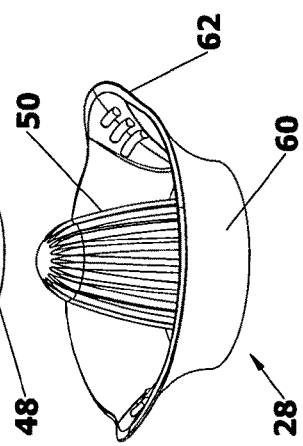
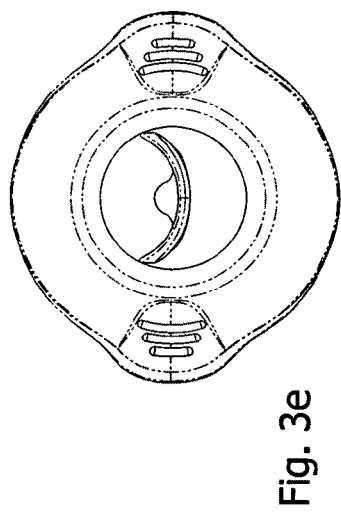
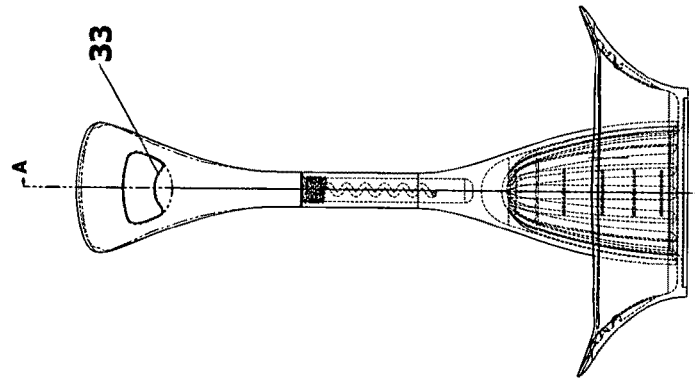
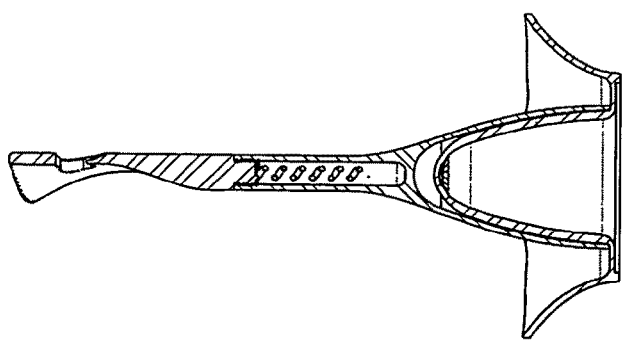

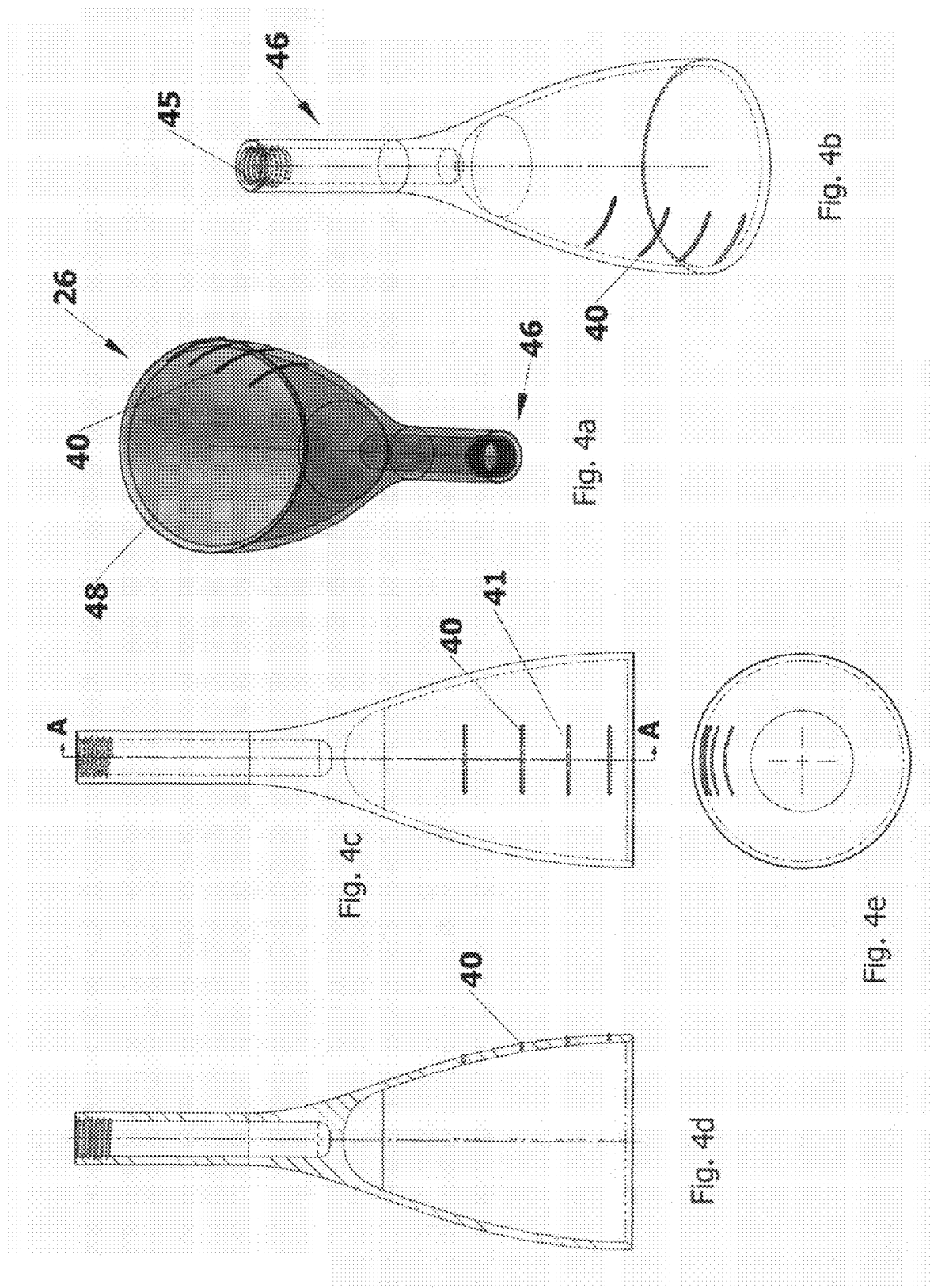

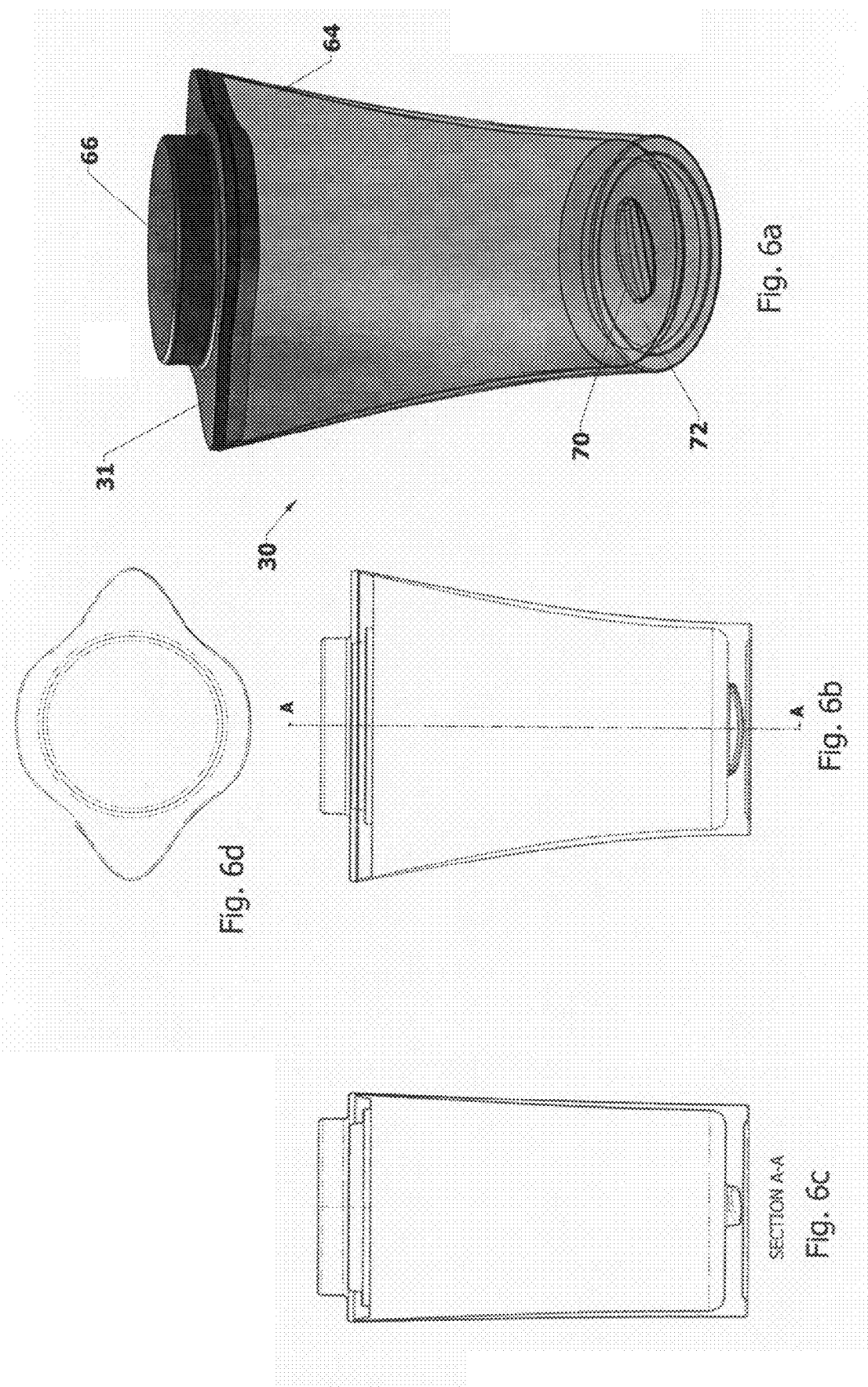

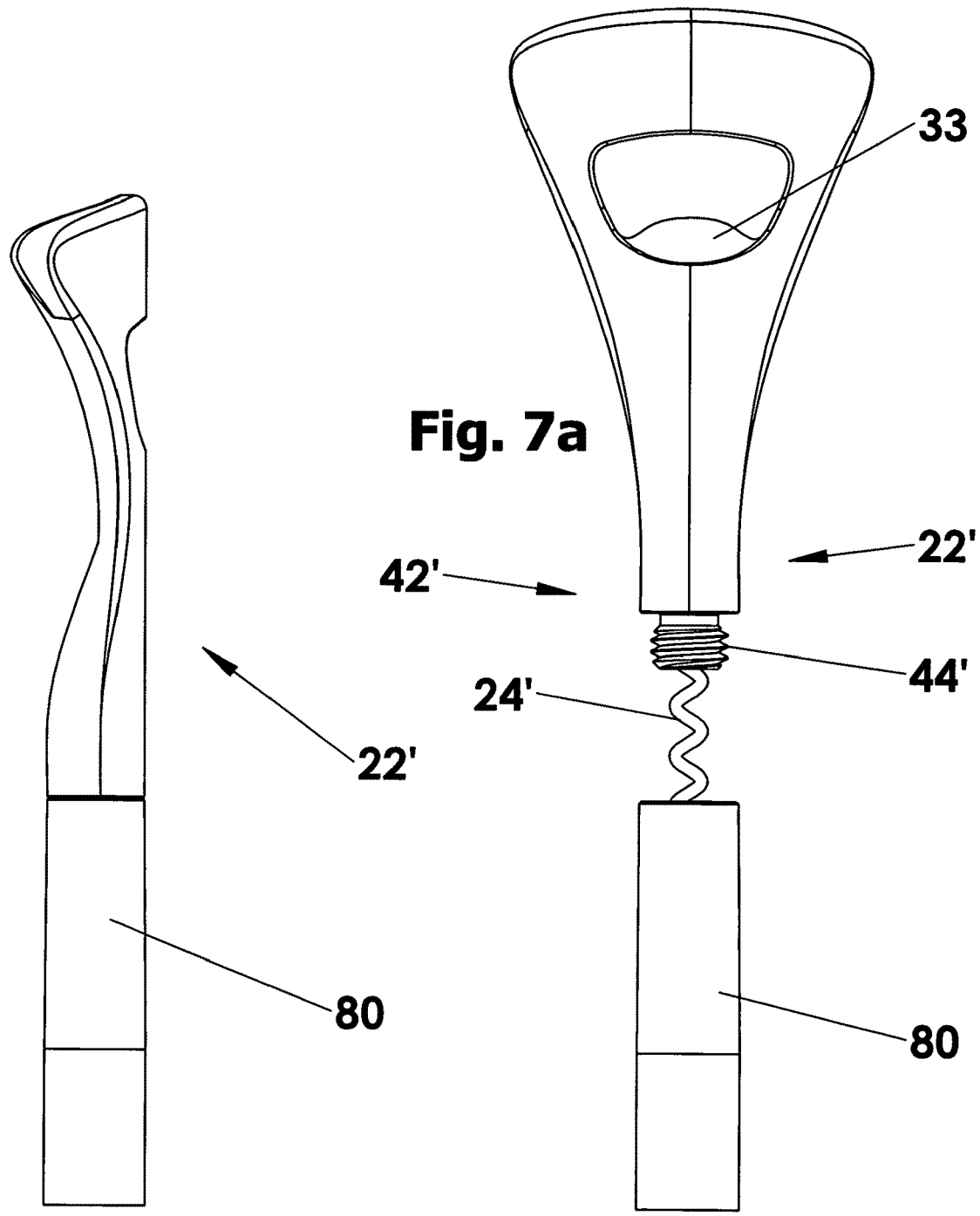

COMBINATION BAR TOOL

RELATED APPLICATIONS AND PRIORITY

This patent application claims the benefit of provisional patent application No. 60/934,562 entitled "Combination Bar Tool," filed Jun. 14, 2007, incorporated herein by reference.

FIELD

This patent application generally relates to a device for serving drinks. More particularly it relates to a device that includes a combination of drink serving tools.

BACKGROUND

Various devices have been available for preparing and serving drinks but none has provided a full range of capability. Thus a better combination tool has been needed, and this tool is provided by this patent application.

SUMMARY

One aspect of the present patent application is a device, comprising a first piece and a second piece. The first piece includes a stirring spoon, a bottle opener, and a corkscrew. The corkscrew has a corkscrew base. The second piece includes a removable cover that attaches to the corkscrew base to cover the corkscrew.

In one aspect the removable cover includes a measuring cup. The measuring cup includes a scribe line. The scribe line is located on an inside surface of the measuring cup. The scribe line may be a protrusion on the inside surface of the measuring cup. The measuring cup can include a plurality of the scribe lines at different levels of the measuring cup. The measuring cup can includes a first scribe line indicating 1 ounce and a second scribe line indicating two ounces.

In one aspect the device further includes a juice squeezer. The juice squeezer has a squeezer portion. The measuring cup pressure fits to the squeezer portion.

In one aspect the device further includes an ice bucket. The ice bucket includes a bottom surface having a recess in which the stirring spoon and bottle opener fit into the recess.

An ice bucket lid can also be included. A juice squeezer can be included that has a bottom surface. The ice bucket lid pressure fits to the juice squeezer bottom surface. The ice bucket lid has a rim and the ice bucket has an ice bucket inner surface. The rim pressure fits to the ice bucket inner surface.

One aspect further includes a cup and a coaster, the cup having a bottom surface that has a recess. The stirring spoon and bottle opener fit into the recess and the coaster pressure fits to the cup.

In one aspect a first portion of the first piece is fabricated of a transparent material and a second portion is fabricated of a metal.

In one aspect a first piece includes a metal. The first piece can be entirely a metal.

In another aspect a first portion of said first piece is fabricated of a plastic material and a second portion of the first piece is fabricated of a metal. The plastic material can include a transparent material.

In one aspect the first piece includes a metal and the second piece includes a plastic material. The plastic material can include a transparent material. The second piece can be entirely a transparent material. The first piece can be entirely metal and the second piece entirely a plastic material.

BRIEF DESCRIPTION OF THE DRAWINGS

The foregoing will be apparent from the following detailed description as illustrated in the accompanying drawings, in which:

FIG. 1a is a side view of one embodiment of a bar tool of the present patent application, that includes a stirring spoon, bottle opener, cork screw, measuring cup, squeezer, ice bucket, and ice bucket lid;

FIG. 1b is a three dimensional view of the bar tool of FIG. 1a;

FIG. 1c is a side view of the bar tool rotated 90 degrees from the view of FIG. 1a;

FIG. 1d is a top view of the bar tool of FIG. 1a;

FIG. 2a is a three dimensional view of the stirring spoon, bottle opener, and cork screw portion of the bar tool of FIGS. 1a-1d;

FIGS. 2b-2e are side, front and top views of the stirring spoon, bottle opener, and cork screw portion of the bar tool of FIG. 2a;

FIGS. 3a, 3d, and 3e are front, side and top views of the stirring spoon, bottle opener, cork screw, measuring cup and squeezer portions of the bar tool of FIGS. 1a-d;

FIG. 3b is a three dimensional view of the stirring spoon, bottle opener, cork screw, measuring cup and squeezer portions of the bar tool of FIG. 3a;

FIG. 3c is an exploded three dimensional view of the stirring spoon, bottle opener, cork screw, measuring cup and squeezer portions of the bar tool of FIG. 3a;

FIGS. 4a and 4b are three dimensional views of the measuring cup of the bar tool of FIG. 1a;

FIGS. 4c, 4d, and 4e are front, side and bottom views of the measuring cup of the bar tool of FIGS. 4a-4b;

FIG. 5a is a three dimensional view of the squeezer of the bar tool of FIG. 1a;

FIGS. 5b and 5d are front, and top views of the squeezer of the bar tool of FIG. 5a;

FIG. 5c is a cross sectional view of the squeezer of the bar tool of FIG. 5a;

FIG. 6a is a three dimensional view of the ice bucket and ice bucket lid of the bar tool of FIG. 1a;

FIGS. 6b, 6c, and 6d are front, and top views of the ice bucket and ice bucket lid of the bar tool of FIG. 6a;

FIGS. 7a, 7b, and 7c are front and side views of another embodiment of the bar tool of the present patent application that includes a stirring spoon, a bottle opener, a cork screw, and a barrel cover for the cork screw;

DETAILED DESCRIPTION

Figure 5A:
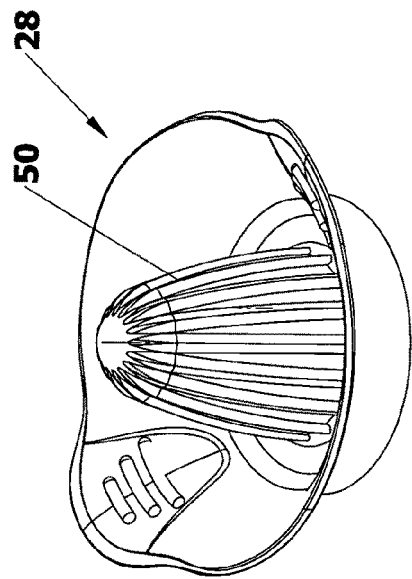
Figure 5C:
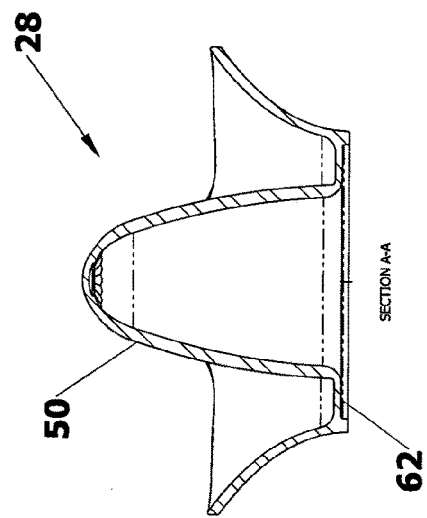
Figure 5D:
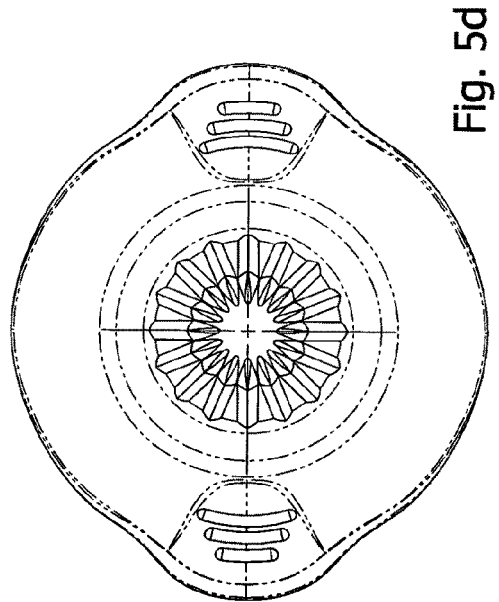
Figure 5B:
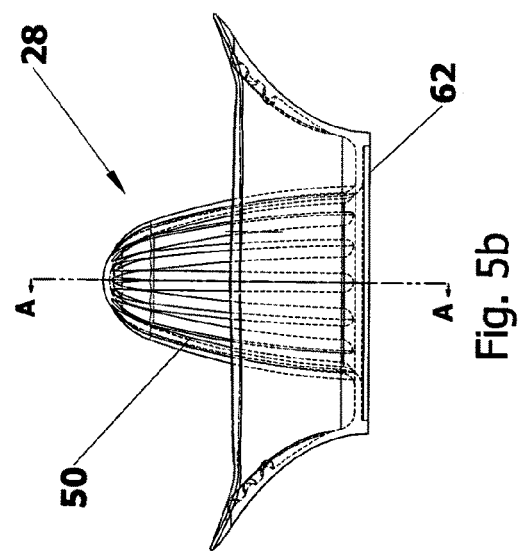

One aspect of the present patent application is a combination bar tool 20 that includes stirring spoon/bottle opener 22, corkscrew 24, measuring cup 26, juice squeezer 28, ice bucket 30, and ice bucket lid 31, as shown in FIGS. 1a-1d. Separate pieces fit together, as shown in FIG. 1.

Corkscrew 24 and stirring spoon/bottle opener 22 are at opposite ends of a single piece 32, as shown in FIGS. 1a-1c and FIGS. 2a-2d.

Single piece 32 can be entirely metal, such as stainless steel, aluminum, or bronze. Alternatively, single piece 32 can have one part fabricated of a food-safe plastic material, such as food safe acrylic, and a second part fabricated of a metal. For example, corkscrew 24 and tip 33 of bottle opener 22 can be fabricated of the metal while other portions of single piece 32 are fabricated of the plastic material. The plastic material can be transparent.

Measuring cup 26 is a separate piece that attaches to corkscrew end 24, as shown in FIGS. 1a-1c and FIGS. 3a-3d. Measuring cup 26 includes lines 40 for indicating volume of liquid in the cup, such as 1 ounce, 2 ounces, 3 ounces, 4 ounces, as shown in FIGS. 1a-1c and FIGS. 4a-4e. Lines 40 can be located on an inside surface of cup 26. Measuring cup 26 can be fabricated of clear plastic allowing lines 40 to be located on an outside surface of cup 26. Lines 40 can be formed of individual dimples 41, as shown in FIG. 4c.

Base 42 of corkscrew 24 includes threaded region 44 that screws into threads 45 at bottom 46 of measuring cup 26.

Measuring cup 26 can be made entirely of metal or it can include a food safe plastic material. The plastic material can be a transparent material. Measuring cup 26 can be made entirely the transparent material. In one embodiment, single piece 32 is entirely metal and measuring cup 26 entirely a transparent plastic material. In another embodiment, single piece 32 has corkscrew 24 and tip 33 made of metal while other portions are made of a food safe plastic while measuring cup 26 is made entirely of a food safe plastic.

Top surface 48 of measuring cup 26 pressure fits to squeezer portion 50 of juice squeezer 28.

Juice squeezer 28 also includes catch basin 60 and a pair of handles/spouts 62, as shown in FIGS. 5a-5d.

Ice bucket 30 extends over stirring spoon/bottle opener 22, corkscrew 24, measuring cup 26, and juice squeezer 28. Ice bucket lid 31 holds bottom 62 of catch basin 60 of juice squeezer 28 with a pressure fit, as shown in FIGS. 1a-1c and FIGS. 6a-6d. Ice bucket lid 31 also has a pressure fit into inner surface 64 of ice bucket 30. Ice bucket lid 31 has handle 66 that allows removal of ice bucket lid 31 from ice bucket 30. Stirring spoon/bottle opener 22 fits into recess 70 of bottom surface 72 of ice bucket 30.

Figure 8A:
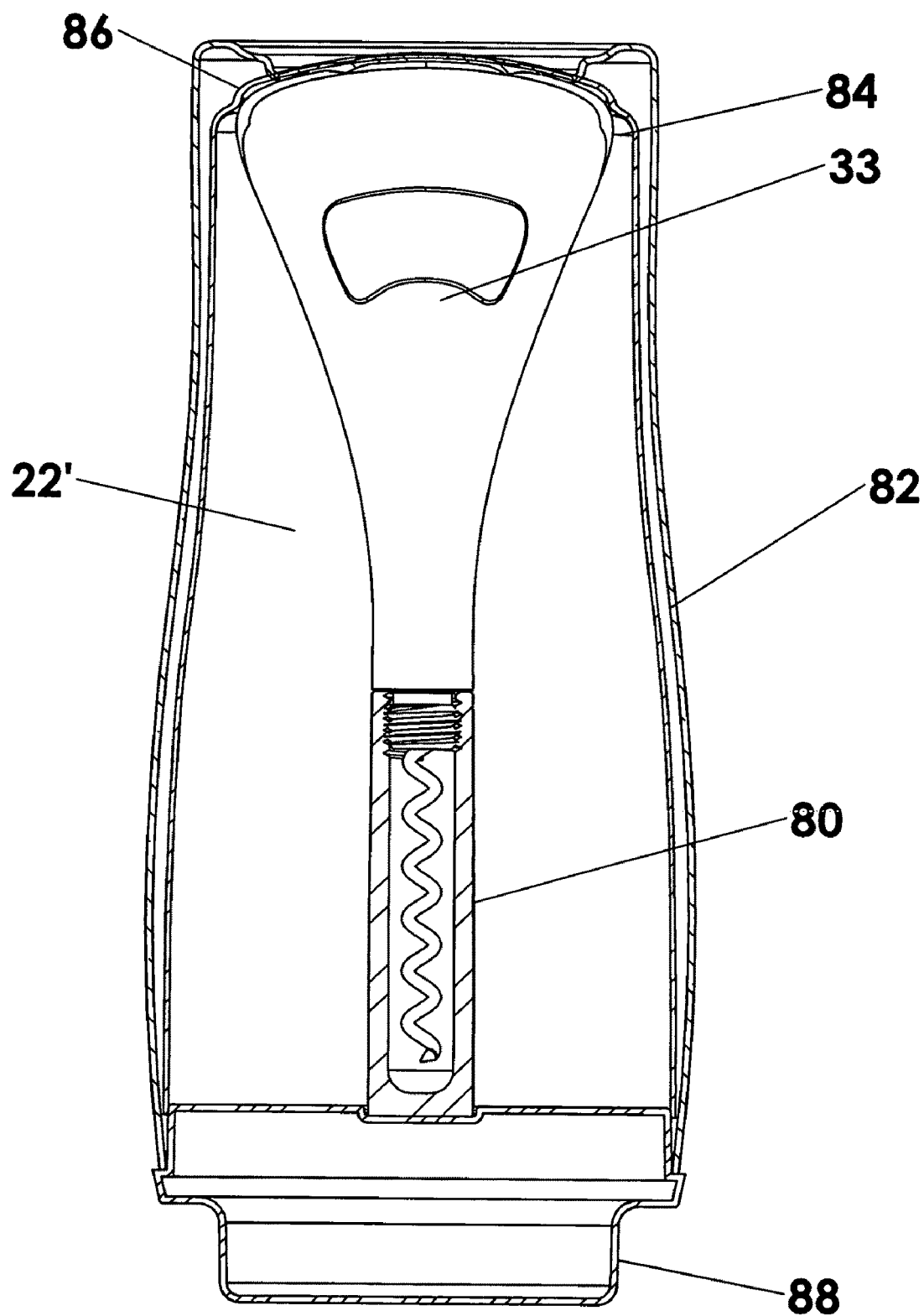
FIG. 8a is a cross sectional view of a minitool that includes the stirring spoon, bottle opener, cork screw, and barrel cover of FIG. 7b fitted into a cup that also has a coaster.
Figure 8B:
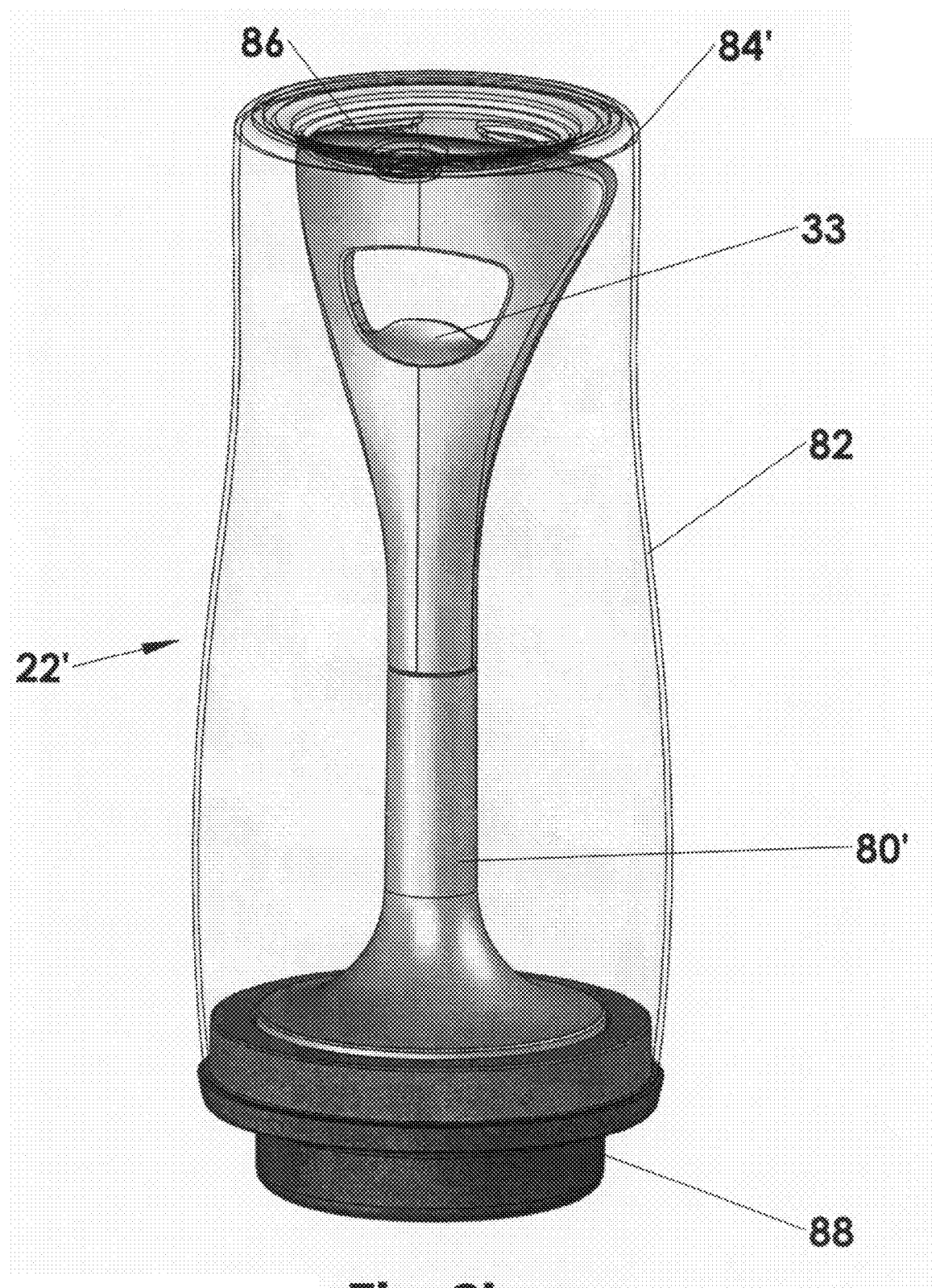
FIG. 8b is a cross sectional view of a minitool similar to that of FIG. 8a in which the barrel cover has a flared bottom so it can stand by itself.

Another aspect of this application includes a minitool that includes stirring spoon/bottle opener 22', corkscrew 24', and barrel 80, as shown in FIGS. 7a-7c. Base 42' of corkscrew 24 and barrel 80 have mating threads 44' for connecting barrel 80 to base 42'. Cup 82 cup includes bottom surface 84 having recess 86, as shown in FIGS. 8a, 8b. Stirring spoon/bottle opener 22' fit into recess 86. Coaster 88 pressure fits to cup 82. In the embodiment of FIG. 8b, barrel 80' has a flared bottom so barrel 80' can stand by itself.

While the disclosed methods and systems have been shown and described in connection with illustrated embodiments, various changes may be made therein without departing from the spirit and scope of the invention as defined in the appended claims.

I claim:

1. A device, comprising a first piece and a second piece, wherein said first piece includes a stirring spoon, a bottle opener, and a corkscrew, wherein said corkscrew has a corkscrew base, wherein said second piece includes a first end and a second end, wherein said first end has a corkscrew cover and wherein said second end has a measuring cup, wherein said corkscrew cover is configured to extend over said corkscrew and attach to said corkscrew base to cover said corkscrew and to connect said second piece to said first piece, and wherein said corkscrew cover is configured to be disconnected from said corkscrew base, disconnecting said second piece from said first piece, and uncovering said corkscrew.

2. A device as recited in claim 1, wherein said measuring cup includes a includes a scribe line.

3. A device as recited in claim 2, wherein said scribe line is located on an outside surface of said measuring cup.

4. A device as recited in claim 3, wherein said scribe line is a protrusion.

5. A device as recited in claim 2, wherein said measuring cup includes a plurality of scribe lines at different levels of said measuring cup.

6. A device as recited in claim 5, wherein said measuring cup includes a first scribe line indicating 1 ounce and a second scribe line indicating two ounces.

7. A device as recited in claim 1, further comprising a juice squeezer, wherein said juice squeezer includes a squeezer portion, wherein said measuring cup pressure fits to said squeezer portion.

8. A device as recited in claim 1, further comprising an ice bucket.

9. A device as recited in claim 8, wherein said ice bucket includes a bottom surface having a recess, wherein said stirring spoon and bottle opener fit into said recess.

10. A device as recited in claim 8, further comprising an ice bucket lid.

11. A device as recited in claim 10, further comprising a juice squeezer, wherein said juice squeezer includes a bottom surface, wherein said ice bucket lid pressure fits to said juice squeezer bottom surface.

12. A device as recited in claim 11, wherein said ice bucket lid has a lid rim, and wherein said ice bucket has an ice bucket rim, wherein said ice bucket rim has an ice bucket rim inner surface, wherein said lid rim pressure fits to said ice bucket rim inner surface.

13. A device as recited in claim 1, further comprising a cup and a coaster, wherein said cup includes a bottom surface having a recess, wherein said stirring spoon and bottle opener fit into said recess, wherein said coaster pressure fits to said cup.

14. A device as recited in claim 13, further comprising a barrel that covers said cork screw, wherein said coaster pressure fits to said barrel.

15. A device as recited in claim 14, wherein said barrel has a flared bottom.

16. A device as recited in claim 1, wherein said first piece includes a metal.

17. A device as recited in claim 16, wherein said first piece is entirely a metal.

18. A device as recited in claim 16, wherein a first portion of said first piece is fabricated of a plastic and wherein a second portion of said first piece is fabricated of a metal.

19. A device as recited in claim 18, wherein said plastic material is a transparent material.

20. A device as recited in claim 1, wherein said first piece includes a metal and wherein said second piece includes a plastic material.

21. A device as recited in claim 20, wherein said plastic material includes a transparent material.

22. A device as recited in claim 21, wherein said second piece is entirely a transparent material.

23. A device as recited in claim 1, wherein said first piece is entirely metal and wherein said second piece is entirely a plastic material.

24. A device as recited in claim 1, wherein said first piece is entirely metal and wherein said second piece is entirely metal.

25. A device as recited in claim 1, wherein said corkscrew cover is configured to be threadably attached to said corkscrew base.

26. A device, comprising a first piece and a second piece, said first piece including a stirring spoon, a bottle opener, and a corkscrew, said corkscrew having a corkscrew base, said second piece including a removable cover that attaches to said corkscrew base to cover said corkscrew, further comprising an ice bucket, an ice bucket lid, and a juice squeezer, wherein said juice squeezer includes a bottom surface, wherein said ice bucket lid pressure fits to said juice squeezer bottom surface.

27. A device as recited in claim 26, wherein said ice bucket lid has a lid rim, and wherein said ice bucket has an ice bucket rim, wherein said ice bucket rim has an ice bucket rim inner surface, wherein said lid rim pressure fits to said ice bucket rim inner surface.

28. A device, comprising a first piece and a second piece, said first piece including a stirring spoon, a bottle opener, and a corkscrew, said corkscrew having a corkscrew base, said second piece including a removable cover that attaches to said corkscrew base to cover said corkscrew, further comprising a cup and a coaster, wherein said cup includes a bottom surface having a recess, wherein said stirring spoon and bottle opener fit into said recess, wherein said coaster pressure fits to said cup, further comprising a barrel that covers said cork screw, wherein said coaster pressure fits to said barrel, wherein said barrel has a flared bottom.

* * * * *